United States Patent
Friedrich et al.

(10) Patent No.: US 6,941,248 B2
(45) Date of Patent: Sep. 6, 2005

(54) SYSTEM FOR OPERATING AND OBSERVING MAKING USE OF MOBILE EQUIPMENT

(75) Inventors: Wolfgang Friedrich, Bubenreuth (DE); Wolfgang Wohlgemuth, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/945,777

(22) Filed: Sep. 4, 2001

(65) Prior Publication Data

US 2002/0049566 A1 Apr. 25, 2002

Related U.S. Application Data

(63) Continuation of application No. PCT/DE00/00667, filed on Mar. 2, 2000.

(30) Foreign Application Priority Data

| Mar. 2, 1999 | (DE) | 199 09 011 |
| Mar. 2, 1999 | (DE) | 199 09 154 |
| Mar. 2, 1999 | (DE) | 199 09 023 |
| Mar. 2, 1999 | (DE) | 199 09 018 |
| Mar. 2, 1999 | (DE) | 199 09 012 |
| Mar. 2, 1999 | (DE) | 199 09 016 |
| Mar. 2, 1999 | (DE) | 199 09 010 |
| Mar. 2, 1999 | (DE) | 199 09 013 |
| Mar. 2, 1999 | (DE) | 199 09 009 |
| Mar. 2, 1999 | (WO) | 00/52540 |

(51) Int. Cl.$^7$ .............................................. G06F 11/00
(52) U.S. Cl. ...................... 702/188; 702/182; 702/183; 702/184; 382/103
(58) Field of Search ............................. 702/33, 67, 68, 702/108, 123, 182–186, 188, 189, FOR 103, FOR 104, FOR 110, FOR 123, FOR 124, FOR 131, FOR 132, FOR 134, FOR 135, FOR 136, FOR 141, FOR 170, FOR 171; 359/630, 13; 353/12–14, 25, 27 A, 28; 382/103; 345/7–9; 348/239

(56) References Cited

U.S. PATENT DOCUMENTS

| 5,712,649 A | | 1/1998 | Tosaki |
| 5,742,263 A | * | 4/1998 | Wang et al. ................ 345/8 |
| 5,748,495 A | | 5/1998 | Arita et al. |
| 5,781,913 A | * | 7/1998 | Felsenstein et al. ........ 707/501 |
| 5,815,411 A | * | 9/1998 | Ellenby et al. ............. 702/150 |
| 5,841,439 A | * | 11/1998 | Pose et al. .................. 345/418 |
| 5,912,650 A | * | 6/1999 | Carollo ......................... 345/7 |
| 5,912,720 A | * | 6/1999 | Berger et al. ............... 351/206 |
| 6,037,882 A | * | 3/2000 | Levy ........................... 341/20 |
| 6,045,229 A | * | 4/2000 | Tachi et al. .................. 353/28 |
| 6,061,064 A | * | 5/2000 | Reichlen .................... 345/418 |
| 6,064,335 A | * | 5/2000 | Eschenbach ........... 342/357.06 |
| 6,064,749 A | * | 5/2000 | Hirota et al. ............... 382/103 |
| 6,091,546 A | * | 7/2000 | Spitzer ....................... 359/618 |
| 6,094,625 A | * | 7/2000 | Ralston ...................... 702/150 |
| 6,181,371 B1 | * | 1/2001 | Maguire, Jr. ................ 348/121 |
| 6,278,461 B1 | * | 8/2001 | Ellenby et al. ............. 345/427 |
| 6,349,001 B1 | * | 2/2002 | Spitzer ....................... 359/618 |
| 6,389,153 B1 | * | 5/2002 | Imai et al. .................. 382/106 |
| 6,408,257 B1 | * | 6/2002 | Harrington et al. ......... 702/150 |
| 2002/0010734 A1 | * | 1/2002 | Ebersole et al. ............ 709/201 |
| 2002/0084974 A1 | * | 7/2002 | Ohshima et al. ............ 345/156 |
| 2004/0131232 A1 | * | 7/2004 | Meisner et al. ............. 382/103 |

FOREIGN PATENT DOCUMENTS

JP 2001195601 A * 7/2001

OTHER PUBLICATIONS

U.S. Appl. No. 60/081,051.*

XP000585192: Daude R. et al: "Head–Monunted Display als facharbeiter–orientierte Unterstützungskomponente an CNC–Werkszeugmaaschinen" Werkstatechnik; S. 248–252.

XP000426833: Kuzuoka H: "Spatial workspace collaboration: A shareview video support system for remote collaboration capability"; S. 533–540.

* cited by examiner

Primary Examiner—Carol S. W. Tsai
(74) Attorney, Agent, or Firm—Baker Botts L.L.P.

(57) ABSTRACT

The invention relates to an operating and observation system, especially for an automation system, which is formed by at least one first operating and observation system having extensive functionality and a multiplicity of further operating and observation tools having limited functionality. The first operating and observation system having the extensive functionality is designed to be mobile, thereby doing away with mobility restrictions.

20 Claims, 3 Drawing Sheets ically controlled apparatus/plant/process. This object is achieved by a system and by a method which is based on the knowledge that in complex plants having spatially distributed individual components, but also in application situations where the mobility of the operator is important, the conventional use of systems installed relatively rigidly (e.g. monitors, operating terminals) for the purpose of visualization and operation imposes significant restrictions on the freedom of movement. Often, the operator/skilled worker is forced by specific situations to leave his normal working situation in order to be able to inform himself of the current relevant process data or to carry out specific operations. The use of mobile, portable equipment allows various working situations to be achieved in a more user-friendly manner.

SYSTEM FOR OPERATING AND OBSERVING MAKING USE OF MOBILE EQUIPMENT

This is a continuation of copending application Ser. No. PCT/DE00/00667 filed Mar. 2, 2000, PCT Publication WO 00/52540, which claims the priority of DE 199 09 154.4, DE 199 09 023.8, DE 199 09 018.1, DE 199 09 012.2, DE 199 09 011.4, DE 199 09 010.6, DE 199 09 013.0, DE 199 09 009.2 and DE 199 09 016.5, all filed Mar. 2, 1999.

FIELD OF THE INVENTION

The invention relates to an operating and observing system which may be used, for example, in the field of automation technology, for production machinery and machine tools, in diagnostic/service support systems, and for complex components, equipment and systems such as vehicles and industrial machinery and plants.

BACKGROUND OF INVENTION

The article by Daude R. et al: entitled "Head-Mounted Display als facharbeiterorientierte Unterstützungskomponente an CNC-Werkzeugmaschinen", ["Head-Mounted Display as a component to assist skilled operators of CNC machine tools"], Werkstattstechnik, DE, Springer Verlag, Berlin, Vol. 86, No. 5, May 1, 1996, pp. 248–252, XP000585192 ISSN: 0340-4544, describes a head-mounted display (HMD) as a component to assist the skilled operator with the steps of setting up, feeding and trouble shooting in milling operations. The technical integration of the HMD into a modern NC control is explained, and the results of a laboratory trial of the HMD are mentioned.

SUMMARY OF INVENTION

The object of the present invention is to provide a system and a method which allows improved mobility in the operation and observation of, in particular, an automatically controlled apparatus/plant/process. This object is achieved by a system and by a method which is based on the knowledge that in complex plants having spatially distributed individual components, but also in application situations where the mobility of the operator is important, the conventional use of systems installed relatively rigidly (e.g. monitors, operating terminals) for the purpose of visualization and operation imposes significant restrictions on the freedom of movement. Often, the operator/skilled worker is forced by specific situations to leave his normal working situation in order to be able to inform himself of the current relevant process data or to carry out specific operations. The use of mobile, portable equipment allows various working situations to be achieved in a more user-friendly manner.

Generally, a plurality of monitors are spatially distributed in the plant, or concentrated together in a control room. The present invention contemplates replacing the deployment of relatively rigidly installed systems for visualization and operation by novel appliances which are used in situ in combination in an application-oriented manner, i.e., a plurality of "minimum-capability devices", specialized for specific applications, which are deployed locally at the machine/plant component.

The complete functionality for visualization and operation covering the entire application is provided by means of high-performance operating units capable of mobile deployment. The essential advantage is to do away with the mobility restrictions to which the operator is subject. In addition, novel interaction techniques are utilized such as speech, gestures, etc. Hence the old situation of being tied to fixed terminals is replaced by mobile appliances, with the machine control panel being replaced or complemented by data goggles, or at least being used in combination with local terminals.

In a preferred embodiment of the present invention, documentation data is either static and/or dynamic. Examples of such static information include technical data from manuals, exploded views, maintenance instructions, etc. Examples of dynamic information include process values such as temperature, pressure, signals, etc.

Rapid, situationally appropriate access to the documentation data is further assisted by the preferred feature that the acquisition means include an image recording device, that analyzing means are provided for analyzing real information in such a way that in an operational context, an object of the documentation data is determined from the real information, and that the system includes visualization means for visualizing the documentation data.

The deployment of augmented-reality (AR) techniques on the basis of the static and/or dynamic documentation data, and/or process data can be optimized for many applications by the acquisition means and/or the visualization means being designed as data goggles.

BRIEF DESCRIPTION OF THE DRAWINGS

The present invention is described and explained below in greater detail with reference to the specific embodiments depicted in the Figures, in which.

DETAILED DESCRIPTION OF THE INVENTION

Figure 1:
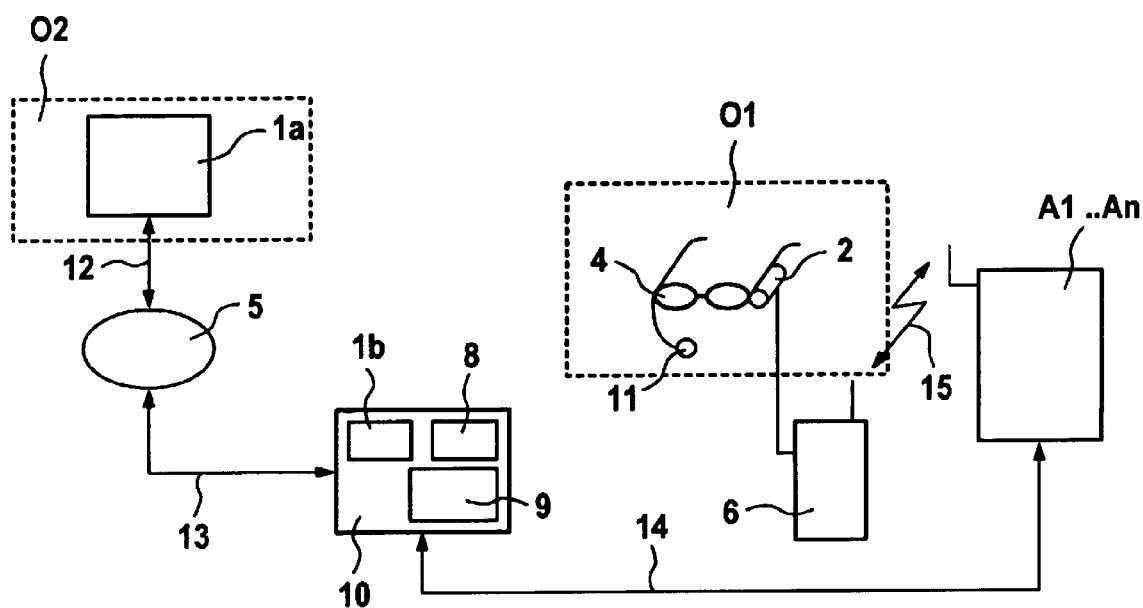
FIG. 1 illustrates a block diagram of a first embodiment of an augmented-reality system.

FIG. 1 shows a schematic depiction of an augmented-reality system for transmitting first information data from a first location O1 to a remote second location O2 of an expert for providing assistance to a user at the first location O1, for example in the event of servicing and/or repair, by the remote expert at the second location. The user, not shown in FIG. 1, is equipped with mobile equipment 4, 6. The mobile equipment 4, 6 includes data goggles 4 fitted with a video camera 2 and a microphone 11. The data goggles are linked to a device for communication without the use of wires, for example a radio transceiver 6, which can communicate with the automation system A1–An via a radio interface 15. The automation system A1–An can be linked, via a data link 14, to an augmented-reality system 10, hereinafter also abbreviated as an "AR" system. The AR system includes an information module 1b for storing or accessing information data, an AR base module 8, and an AR application module 9. The AR system 10 can be linked to the Internet 5 via a data link 13, with optional access to further storage data and documentation data 1a via an Internet link 12 shown by way of example.

A user equipped with data goggles 4 and the mobile radio transmitter 7 is able to move freely within the plant A1–An for maintenance and service purposes. For example, if maintenance or repair to a particular subcomponent of plants Al–An has to be carried out, appropriate access to the relevant documentation data 1a, 1b is established with the aid of the camera 2 of the data goggles 4, optionally controlled by speech commands detected by the microphone 11. To do this, a data link with plant Al–An or with an appropriate radio transmitter unit is set up via the radio interface 15, and the data transmitted to the AR system 10. Within the AR system, the data obtained from the user are analyzed in accordance with the situation, and information data 1a, 1b are accessed automatically or in a manner controlled interactively by the user. The relevant documentation data 1a, 1b obtained are transmitted via the data links 14, 15 to the radio transmitter 6, with the overall result that an analysis is carried out on the basis of the detected operational situation, said analysis forming the basis for the selection of data from the available static information. This results in a situationally appropriate, object-oriented, or component-oriented selection of relevant knowledge from the most up-to-date data sources 1a, 1b. Information is displayed with the aid of the visualization component used in each case, for example a handheld PC or data goggles. The operator is therefore provided in situ with only the up-to-date information he needs. The service technician therefore does not suffer from information overload from a "100-page manual", for example.

Figure 2:
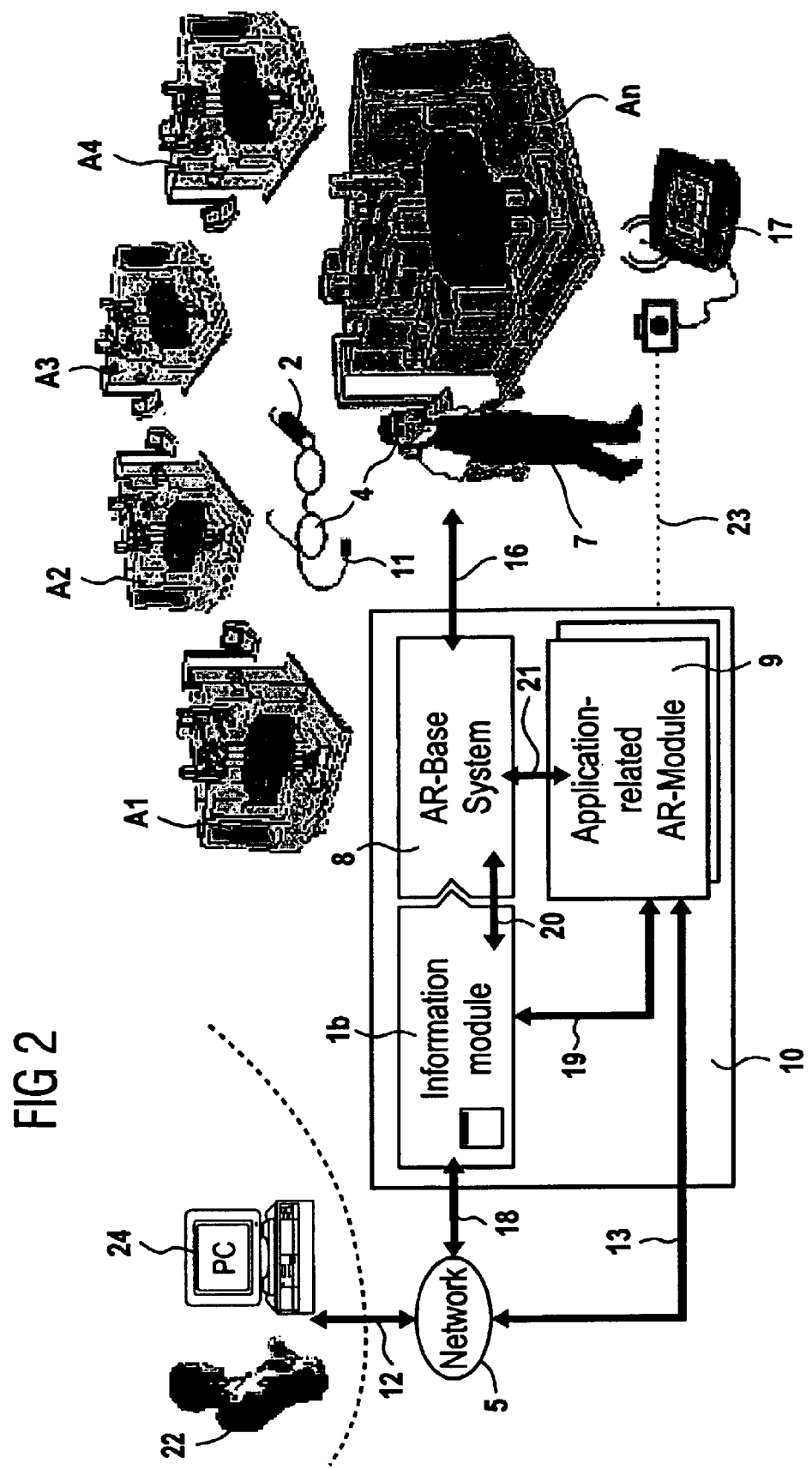
FIG. 2 illustrates a further block diagram of an embodiment of an augmented-reality system.

FIG. 2 shows a further specific application of a documentation processing system for service and maintenance. The system consists of an augmented-reality system 10 which comprises an information module 1b for storing information data, an AR base system 8, and an AR application module 9. The AR system 10 can be linked to the Internet 5 via connecting lines 13, 18. Linkage is also possible, via an exemplary data link 12, to a remote PC 24 with a remote expert 22. Linkage between the individual modules of the AR system 10 is effected via links 19, 20, 21. Communication between a user 7 and the AR system is effected via interfaces 16, 23. To this end, the AR system can be linked to a transceiver which enables bidirectional data communication between the AR system 10 and the user 7 via data goggles 4, either directly via the interface 16, or via a radio transceiver 17 located in the vicinity of the user 7 via an interface 23. The link 23 can be implemented via a separate data link or via the mains as a "power-line" modem. In addition to a display device disposed in the vicinity of the eye pieces, the data goggles 4 may further comprise an image recording device 2 in the form of a camera and a microphone 11. With the aid of the data goggles 4, the user 7 can move round the plants Al–An and carry out service or maintenance activities.

Figure 3:
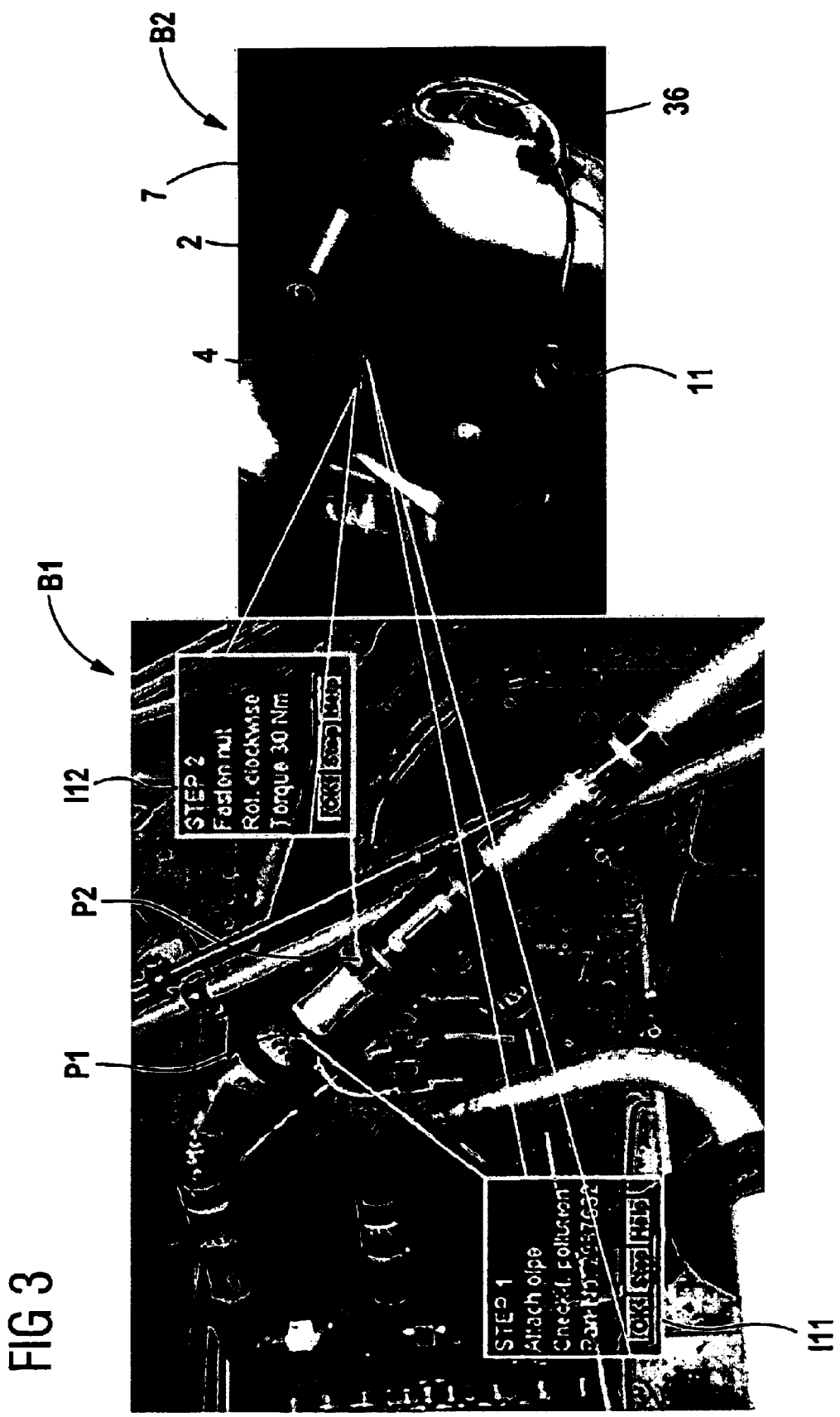
FIG. 3 illustrates a specific application for situationally appropriate access to expert knowledge and/or documentation data.

By means of the data goggles 4 and the corresponding radio transceivers, e.g. the radio transceiver 17 worn by personnel directly on the body, it is possible to achieve preventive functionality. The initial step is the detection of the respective operational situation, for example by the camera 2 or via location by the personnel 7. On the basis of the operational situation detected, a selection of data from the plant Al–An undergoing maintenance is made in the AR system. The fundamental advantage of the system depicted in FIG. 3 is that this system assists the cooperation of the individual single functionalities in application-relevant manner. A concrete operational situation is first detected automatically, and this operational situation is then analyzed, the relevant aspects of which are determined automatically from the most up-to-date available static information in conjunction with the dynamic data acquired instantaneously. As a result, assembly suggestions are correlated with current process data. Personnel 7 are provided with a situationally appropriate display of the relevant information, by a superimposed visualization of the respective data in such a way that the real operational situation in the field of view of the personnel is expanded by the acquired information. As a result, personnel 7 are very rapidly put in the position of being able to act, thereby ensuring optimal machine operating times. Assistance to the maintenance technician 7 in situ can also be provided via the remote expert 22, along with the knowledge available at the location of the remote expert 22.

FIG. 3 shows a specific application of situationally appropriate access to documentation data. FIG. 3 shows a first monitor region B1 which shows a plant component. Shown in the right-hand monitor region B2 is a user 7 who, for example, is looking at an individual plant component. The user 7 is equipped with data goggles 4 which comprise a camera 2 as acquisition means. Additionally disposed on the data goggles 4 are a microphone 11 and a loudspeaker 36. The left-hand monitor region B1 shows a view of conduits which can be viewed with the data goggles shown in window B2. Marked in the left-hand monitor region B1 are two points P1, P2 which each represent two image details viewed with the aid of the data goggles 4. After the first point P1 has been viewed, i.e. after the conduit disposed at or near point P1 has been viewed, additional information is visualized for the user 7 in the data goggles 4. This additional information I11 consists of documentation data which, in connection with the first point P1, include operational instructions for this pipe section and, in connection point P2, comprise the installation instruction to be implemented in a second step. The installation instruction in this case consists of the user 7 being informed of the torque and the sense of rotation of the screwed joint of point P2 via visualization of the additional data I12. The user 7 is therefore quickly provided with situationally appropriate instructions for the object being viewed. If an intelligent tool is used which is able to detect the torque applied at any given moment, it is also possible for the user to be told, on the basis of the current torque, to increase or reduce the torque as required.

The field of application of the present invention involves an application-oriented requirement analysis and development of AR-based systems to support operational processes, production and servicing of complex engineering products, fabrication and process technology, service support systems for motor vehicles, or for maintaining any industrial equipment.

Augmented reality, AR in brief, is a novel type of man-machine interaction of major potential for supporting industrial operational processes. With this technology, the field of view of the observer is enriched with computer-generated virtual objects, which means that intuitive use can be made of product or process information. In addition to the extremely simple interaction, the deployment of portable computers opens up AR application fields involving high mobility requirements, for example if process, measured or simulation data are linked to the real object.

Today, German industry is characterized by increasing customer requirements in terms of individuality and quality of products and by the development processes taking substantially less time. In developing, producing and servicing complex industrial products and plants it is possible by means of innovative solutions to man-machine interaction both to achieve progress in efficiency and productivity, and to design the work so as to enhance competence and training, by supporting the user's need for knowledge and information in a situationally appropriate manner on the basis of up-to-date data.

Augmented reality is a technology with numerous innovative fields of application:

In development, for example, a "mixed mock-up" approach based on a mixed-virtual environment can result in a distinct acceleration of the early phases of development. Compared with immersive, i.e. immersing "virtual reality" (VR) solutions, the user is at a substantial advantage in that the haptic properties can be depicted faithfully with the aid of a real model, whereas aspects of visual perception, e.g. for display variants, can be manipulated in a virtual manner. In addition, there is a major potential for user-oriented validation of computer-assisted models, e.g. for component verification or in crash tests.

In flexible production it is possible, inter alia, to considerably facilitate the process of setting up machinery for qualified skilled operators by displaying, e.g. via mobile AR components, mixed-virtual clamping situations directly in the field of view. Fabrication planning and fabrication control appropriate to the skilled worker in the workshop is facilitated if information regarding the respective order status is perceived directly in situ in connection with the corresponding products. This also applies to fitting, with the option of presenting the individual procedural steps to the fitter in a mixed-virtual manner even in the training phase. In this connection it is possible, e.g. by comparing real fitting procedures with results of simulations, to achieve comprehensive optimizations which both improve the quality of operation scheduling and simplify and accelerate the fitting process in the critical start-up phase.

Finally, regarding service, conventional technologies are by now barely adequate for supporting and documenting the complex diagnostic and repair procedures. Since, however, these processes in many fields are in any case planned on the basis of digital data, AR technologies provide the option of adopting the information sources for maintenance purposes and of explaining the dismantling process to an engineer, e.g. in the data goggles, via the superposition with real objects. Regarding cooperative operation, the AR-assisted "remote eye" permits a distributed problem solution by virtue of a remote expert communicating across global distances with the member of staff in situ. This case is particularly relevant for the predominantly medium-sized machine tool manufacturers. Because of globalization, they are forced to set up production sites for their customers worldwide. Neither, however, is the presence of subsidiaries in all the important markets achievable on economic grounds, nor is it possible to dispense with the profound knowledge of experienced service staff of the parent company with respect to the increasingly more complex plants.

The special feature of man-machine interaction in augmented reality is a very simple and intuitive communication with the computer, supplemented, for example, by multimode interaction techniques such as speech processing or gesture recognition. The use of portable computer units enable entirely novel mobile utilization scenarios, with the option of requesting the specific data at any time via a wireless network. Novel visualization techniques permit direct annotation, e.g. of measured data or simulation data, to the real object or into the real environment. In conjunction with distributed applications, a number of users are able to operate in a real environment with the aid of a shared database (shared augmented environments) or to cooperate with AR support in different environments.

Augmented reality has been the subject of intense research only in the last few years. Consequently, only a few applications exist, either on the national or the international level, usually in the form of scientific prototypes in research establishments.

U.S.A.: As with many novel technologies, the potential uses of augmented reality were first tapped in North America. Examples include cockpit design or maintenance of mechatronic equipment. The aircraft manufacturer Boeing has already carried out initial field trials using AR technology in the assembly field. The upshot is that in this hi-tech area too the U.S.A. occupy a key position, potentially making them technological leaders.

Japan: Various AR developments are being pushed in Japan, e.g. for mixed-virtual building design, telepresence or "cyber-shopping". The nucleus is formed by the Mixed Reality Systems Laboratory founded in 1997, which is supported jointly as a center of competence by science and by commerce and industry. Particular stimuli in the consumer goods field are likely in the future from the Japanese home electronics industry.

Europe: So far, only very few research groups have been active in Europe in the AR field. One group at the University of Vienna is working on approaches to mixed-real visualization. The IGD group, as part of the ACTS project CICC, which has now come to an end, has developed initial applications for the building industry and a scientific prototype for staff training in car manufacturing.

The present invention should be seen in the specific context of the fields of application, e.g., "production machinery and machine tools" (NC-controlled, automation-technology processes), and "diagnostics/service support systems for complex engineering components/equipment/systems" (e.g. vehicles, but also industrial machinery and plants).

Not only in complex plants having spatially distributed individual components, but also in application situations where the mobility of the operator is important, the conventional use of rigidly installed systems (e.g. monitors, operating terminals) for the purpose of visualization and operation imposes significant restrictions on the freedom of movement. Often, an operator or skilled worker is forced to leave his normal working situation in order to be able to inform himself of the current relevant process data or to carry out specific operations. The use of mobile, portable equipment allows various working situations to be achieved in a more user-friendly manner.

Depending on requirements, a plurality of monitors are spatially distributed in the plant, or concentrated together, for example in a control room. The deployment of such rigidly installed systems for visualization and operation, is, in accordance with the presented invention replaced by novel appliances which are used in combination in an application-oriented manner, e.g., a plurality of "minimum-capability devices", specialized for specific applications, are locally deployed at the machine/plant component.

In summary, the present invention therefore provides an operating and observation system, especially for an automation system, which is formed by at least one first operating and observation system having extensive functionality and a multiplicity of further operating and observation tools having limited functionality. The first operating and observation system having the extensive functionality is designed to be mobile, thereby doing away with mobility restrictions.

What is claimed is:

1. A system for operating and observing, comprising at least one mobile equipment for wireless communication with a stationary system wherein the mobile equipment can send and receive audio and video signals and wherein the stationary system is connected to an augmented reality system via a data link and wherein information about the stationary system is requested through the mobile equipment through either said audio and/or video signals and the augmented reality system provides said requested information about said stationary system to said mobile equipment.

2. The system according to claim 1, wherein the mobile equipment comprises at least data goggles, a microphone, and a camera which are driven by multimode interaction techniques.

3. The system according to claim 1, wherein the mobile equipment further comprises acquisition means for acquiring first information data, and visualization means for visualizing second information data.

4. The system according to claim 3, wherein the acquisition means is an image recording device which is user-controlled.

5. The system according to claim 3, wherein the acquisition means are designed as speech-controlled acquisition means.

6. The system according to claim 3, wherein the acquisition means are controlled by control data.

7. The system according to claim 3, wherein the visualization means comprises a display device located on eye pieces of data goggles, and the acquisition means comprise an image recording device located on the data goggles, and further comprising a microphone in order to detect speech commands located on the data goggles.

8. An augmented reality method of operating and observing, an apparatus, comprising the steps of:
    using a mobile equipment for wireless communication with a stationary system;
    sending audio and/or video signals including information about the status of said stationary system;
    transmitting said information through the stationary system to an augmented reality system via a data link and requesting information about the stationary system; and
    providing the requested information from the augmented reality system about said stationary system to said mobile equipment.

9. The method according to claim 8, wherein the mobile equipment comprises at least data goggles, a microphone, and a camera and further comprising the step of driving the mobile equipment by multimode interaction techniques.

10. The method according to claim 8, further comprising the step of acquiring first information data by an acquisition means, and visualizing second information data by means of visualizing means.

11. The method according to claim 10, wherein the acquisition means is an image recording device which is user-controlled.

12. The method according to claim 10, wherein the acquisition means are designed as speech-controlled acquisition means.

13. The method according to claim 10, wherein the acquisition means are designed as acquisition means controlled by control data.

14. The method according to claim 10, wherein the visualization means is designed as a display device arranged on an eye piece of a pair of data goggles, the acquisition means are an image recording device arranged on the data goggles, and further comprising detecting speech commands by a microphone located on the data goggles.

15. The system according to claim 1, wherein the augmented reality system is connected to another remote location for providing an expert assistance through the Internet.

16. The system according to claim 1, wherein the augmented reality system comprises an information module for storing or accessing information.

17. The system according to claim 1, wherein the mobile equipment includes a camera.

18. The system according to claim 1, wherein the mobile equipment includes a microphone.

19. The system according to claim 1, wherein the mobile equipment includes a data goggle.

20. The method according to claim 8, wherein the augmented reality system is coupled with the Internet and further comprising the step of requesting an expert assistance through the Internet.

* * * * *